US012756632B2

(12) United States Patent
Ballew et al.

(10) Patent No.: US 12,756,632 B2
(45) **Date of Patent: *Oct. 6, 2026**

(54) FILTERED ADVERTISEMENTS OF SECONDARY SERVERS

(71) Applicant: CenturyLink Intellectual Property LLC, Denver, CO (US)

(72) Inventors: Dean Ballew, Sterling, VA (US); John R.B. Woodworth, Amissville, VA (US)

(73) Assignee: CenturyLink Intellectual Property LLC, Denver, CO (US)

( * ) Notice: Subject to any disclaimer, the term of this patent is extended or adjusted under 35 U.S.C. 154(b) by 7 days.

This patent is subject to a terminal disclaimer.

(21) Appl. No.: 19/220,329

(22) Filed: May 28, 2025

(65) Prior Publication Data

US 2025/0286786 A1 Sep. 11, 2025

Related U.S. Application Data

(63) Continuation of application No. 18/647,589, filed on Apr. 26, 2024, now Pat. No. 12,323,303, which is a continuation of application No. 17/822,231, filed on Aug. 25, 2022, now Pat. No. 11,973,654.

(60) Provisional application No. 63/254,596, filed on Oct. 12, 2021.

(51) Int. Cl.

| | |
|---|---|
| ***H04L 41/12*** | (2022.01) |
| ***H04L 45/16*** | (2022.01) |
| ***H04L 45/74*** | (2022.01) |
| ***H04L 67/1021*** | (2022.01) |

(52) U.S. Cl.

CPC .............. *H04L 41/12* (2013.01); *H04L 45/16* (2013.01); *H04L 45/74* (2013.01); *H04L 67/1021* (2013.01)

(58) Field of Classification Search

CPC ......... H04L 41/12; H04L 45/16; H04L 45/74; H04L 67/1021; H04L 45/04

See application file for complete search history.

(56) References Cited

U.S. PATENT DOCUMENTS

| | | | |
|---|---|---|---|
| 9,385,925 | B1 | 7/2016 | Scholl |
| 2021/0314906 | A1 | 10/2021 | Matolia |
| 2022/0321479 | A1 | 10/2022 | Calder |
| 2023/0110418 | A1 | 4/2023 | Ballew |
| 2024/0297825 | A1 | 9/2024 | Ballew |

*Primary Examiner* — Schquita D Goodwin
*Assistant Examiner* — Joseph M Cousins

(57) ABSTRACT

In examples, a first Anycast advertisement is received from a first server identifying the first server as a primary address for a service. In addition, a second Anycast advertisement is received from the first server identifying the first server as a secondary address for the service. Further, a third Anycast advertisement is received from a second server identifying the second server as the secondary address for the service. A first community advertisement is also from the first server identifying the first server as a member of a first community. Thereafter, a first request is received from a client including the primary address, and the request is routed to the first server. When a second request from the client is received including the secondary address, based at least on the community advertisement, the first server is ignored, and the second request is routed to the second server.

20 Claims, 4 Drawing Sheets

FILTERED ADVERTISEMENTS OF SECONDARY SERVERS

BACKGROUND

According to the Anycast routing protocol, multiple servers may advertise the same internet protocol (IP) address. Routers receive advertisements from the servers and direct requests addressed to the shared Anycast IP address to one of the servers based on routing criteria. For example, when a router receives a client request directed to the Anycast address, the router may follow its routing logic to determine which of the servers advertising that Anycast address to use-typically following a least-cost routing based on topographical distance, among other algorithms. It is with respect to this general environment that aspects of the present disclosure are directed.

SUMMARY

In aspects, systems and methods are provided for performing routing in a computing network. In examples, a first Anycast advertisement is received from a first server identifying the first server as a primary address for a service, a second Anycast advertisement is received from the first server identifying the first server as a secondary address for the service, and a third Anycast advertisement is received from a second server identifying the second server as the secondary address for the service. In aspects, a first community advertisement is also received from the first server identifying the first server as a member of a first community. In examples, when a first request from a client is received including the primary address, the first request is routed to the first server; however, when a second request is received from the client including the secondary address, based at least on the community advertisement, the first server is ignored, and the second request is routed to the second server.

In examples, the service is a domain name service. Further, in examples, the community advertisement is a border gateway protocol community advertisement. Also, in examples, the first community is a collection of servers in a particular geographic area and the routing device is located in the particular geographic area. In further examples, the second server is outside of the particular geographic area. In additional examples, a second community advertisement is received from the first server identifying the first server as a member of a second community, and the first server is ignored and the second request is routed to the second server is based on determining that the first server is a member of both of the first community and the second community. Further, in some examples, the second server is a member of the first community but not the second community. In addition, in some examples, the second community comprises servers that are advertising both of the first address and the second address.

DETAILED DESCRIPTION

Some high availability services, such as domain name services, require that each client device be provided a primary Anycast IP address and a secondary Anycast IP address. For example, a dynamic host configuration protocol (DHCP) server may provide both a primary Anycast IP address and a secondary Anycast IP address to a client for the client to use in resolving a domain host name query. If the request to the primary Anycast address fails, then the client sends the request to the secondary Anycast address.

Typically, the network may be architected with separate servers for the primary and secondary addresses, however, this can result in the secondary server being underutilized when the system is operating normally. For example, if a first server advertises only the primary Anycast address and a second server advertises only the secondary Anycast address, then the second server is not being used so long as the first server is operating as it should. Further, if the first and second server are located in the same geographic site (e.g., the same data center), then both of the first and second server may fail at the same time (if the failure is site-wide rather than limited to just the first server).

In example aspects of the presently disclosed systems and methods, each server advertises both of the primary and secondary Anycast IP addresses for a service (such as a domain name system (DNS) service). Although aspects of the present disclosure are described in relation to DNS services, the present systems and methods may be used to manage other types of services as well. In order to provide redundancy and high availability, each server also advertises membership in one or more communities, such as BGP communities. For example, a first server may advertise both the primary and secondary Anycast IP addresses and also advertise that it is in a “Miami” community (indicating that it is geographically located in Miami). A router receiving a request directed to the primary address from a client near Miami may be programmed to send the request to the first server because that routing comprises the least-cost routing.

If the request to the primary Anycast IP address fails, the client is programmed to send the request to the secondary Anycast IP address. However, in examples of the presently disclosed systems and methods, the router is programmed to ignore the first server because of its membership in the Miami community and instead sends the request to another server (outside the Miami community) that is advertising the secondary address (e.g., a server in Dallas). In this way, there is no need for dedicated secondary servers, while redundancy is maintained (in case of an outage in Miami). Further, advertised server memberships in other communities can also be used for more granular filtering of servers when routing requests directed to the secondary Anycast IP address.

Figure 1:
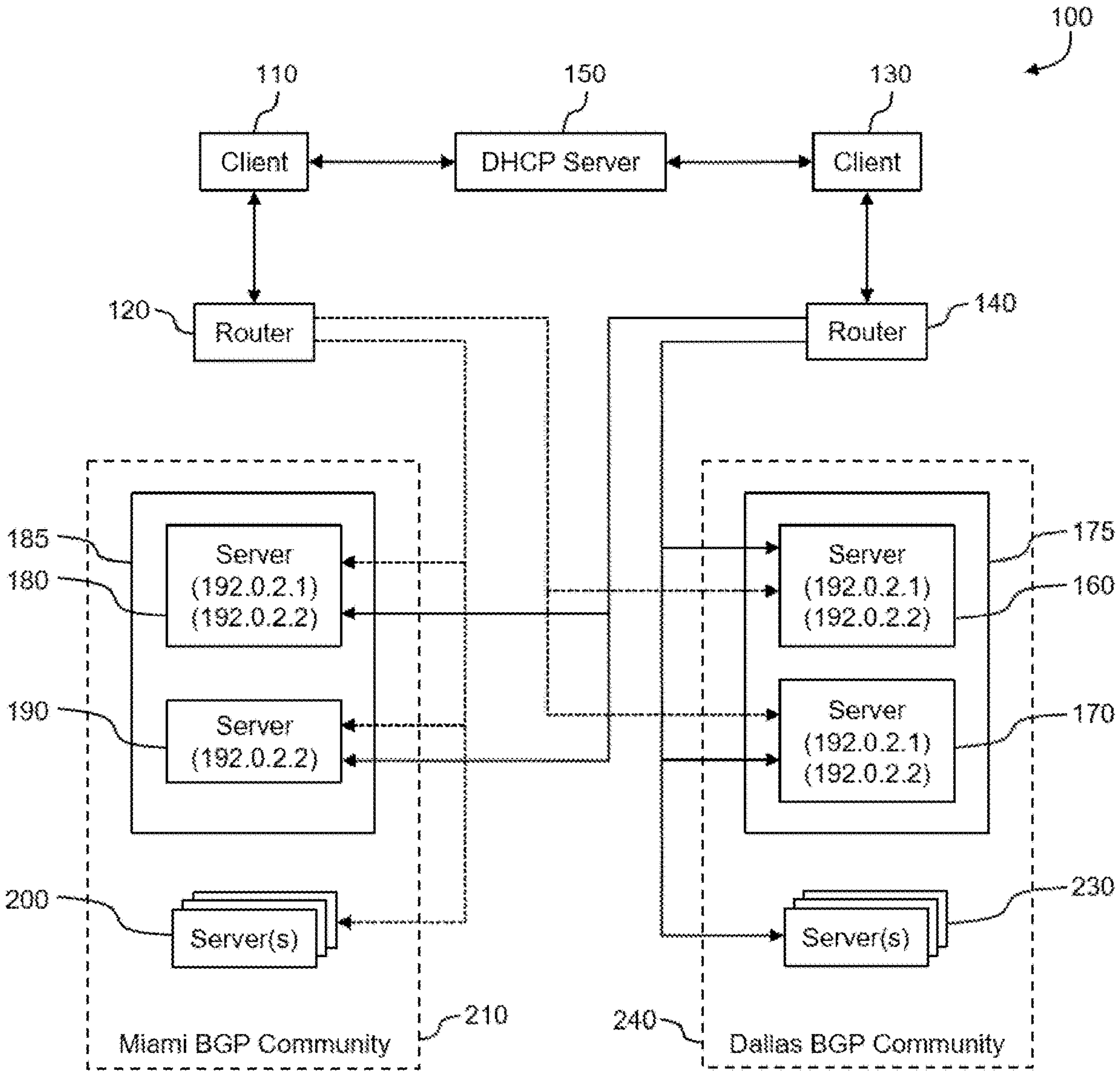
FIG. 1 depicts an example system for filtering advertisements of secondary servers in a computing network.

FIG. 1 depicts an example system 100 for filtering advertisements of secondary servers in a network. In examples, client 110 is a computing device located in or near Miami, Florida. Router 120 is the router logically nearest client 110 and is also located in or near Miami, Florida. Client 130 is a computing device located in or near Dallas, Texas. Router 140 is the router logically nearest client 130 and is also located in or near Dallas, Texas. Both client 110 and client 130 utilize a service, such as a high-availability service (e.g., DNS service) that requires that all clients receive both a primary and a secondary Anycast address to use in accessing the service. In this example, DHCP server 150 provides each of client 110 and client 130 a primary Anycast address (192.0.2.1) and a secondary Anycast address (192.0.2.2).

In examples, when client 110 attempts to access the service (e.g., DNS service), it sends a request with the primary Anycast address (192.0.2.1) to router 120. Router 120 then determines which of multiple servers advertising the primary Anycast address (192.0.2.1) should receive the request. For example, router 120 stores and executes routing logic to determine the best server to receive the request. Upon determining the best server to receive the request (e.g., by executing a least-cost-routing algorithm, or otherwise), the router 120 may then send the request to the Unicast address for that selected server. Servers 160 and 170 may be collocated in a single site 175 at a geographic location in or near Dallas, Texas, while servers 180 and 190 may be collocated in a single site 185 at a geographic location in or near Miami, Florida. In this example, servers 160, 170, and 180 advertise the primary Anycast address (192.0.2.1). As such, router 120 may execute routing logic to identify the best (e.g., least-cost) routing for the request from client 110 to one of the servers 160, 170, or 180. In this example, the request to the primary Anycast address may be routed to server 180, which is located in or near Miami, Florida, like client 110.

If the request to the primary Anycast address fails, however, client 110 may issue a request addressed to the secondary Anycast address (192.0.2.2). Upon receiving the request addressed to the secondary Anycast address (192.0.2.2), router 120 may determine where to route the request based on both (a) the server(s) advertising the secondary Anycast address (192.0.2.2); and (b) advertised membership of such servers in particular communities, such as border gateway protocol (BGP) communities. For example, a BGP community may be defined for all servers located in or near Miami, Florida. In this example, servers 180 and 190, and additional servers 200 may be members of the Miami BGP Community 210. Members of Miami BGP Community 210 advertise their membership, and router 120 is programmed to keep a record of the servers' advertised memberships in BGP communities. Further, because router 120 is located in or near Miami, it may be programmed to ignore any servers that advertise membership in the Miami BGP Community 210 for client requests addressed to secondary Anycast address (192.0.2.2).

In examples, the when the router 120 receives a request addressed to the secondary Anycast address (192.0.2.2), router 120 may be programmed to ignore any servers advertising the secondary Anycast address (192.0.2.2) that are also members of the Miami BGP Community 210. In this example, router 120 would ignore routers 180, 190, and 200 in determining where to route the request addressed to secondary Anycast address (192.0.2.2), and the request would be addressed, e.g., using the Unicast address of one of routers 160 or 170. By excluding servers within the Miami BGP Community 210, the system 100 allows, e.g., server 180 to advertise and serve as both a primary and secondary service when operating normally, but it prevents router 120 from going back to server 180 (that would have just failed the request to the primary Anycast address) when making a request to the secondary Anycast address. In this example, the router would also not send the request addressed to the secondary Anycast address (192.0.2.2) to server 190, or any of the other servers 200 that are part of Miami BGP Community 210, even if those servers had not specifically failed. In examples, it is preferable to assume that the reason for the failure of the request to the primary Anycast address is an outage in the area that might have affected any servers in the Miami BGP Community 210, even though the routing to a farther server (e.g., 160, 170) will result in a potential latency penalty.

In other examples, the router 120 may utilize one or more additional BGP communities in making a routing decision that is more granular. For instance, system 100 may define a BGP community for all servers that advertise service for both of the primary Anycast address (192.0.2.1) and the secondary Anycast address (192.0.2.2) (referred to herein as Primary/Secondary Servers). In the example shown in FIG. 1, servers 160, 170, and 180 are Primary/Secondary Servers, but server 190 advertises only secondary Anycast address (192.0.2.2), so it is not a Primary/Secondary Server. In examples, router 120 may be programmed, in response to receiving a request addressed to secondary Anycast address (192.0.2.2), to ignore any servers that are members of both (a) the Miami BGP community 210 and (b) the Primary/Secondary Server BGP community. In this instance, the router 120 would then likely route the request from client 110 that is addressed to secondary Anycast address (192.0.2.2) to server 190 (which is likely logically closer to router 120 that servers 160 and 170). In this example embodiment, the system 100 allows for a logically closer server (e.g., 190) to act as a dedicated backup server to server 180, even though it is a member of the same Miami BGP Community 190.

In still other examples, the router 120 may utilize one or more additional BGP communities in making a routing decision that is even more granular. For instance, system 100 may define a BGP community for all servers that are within a particular single site. For example, a BGP community may be defined for site 185 that houses both of servers 180 and 190 (hereinafter referred to as South Beach Site Servers). In examples, the South Beach Site might be a data center located in the South Beach area of Miami, Florida. In the example shown in FIG. 1, servers 180 and 190 are South Beach Site Servers, but additional servers 200 are not South Beach Site Servers even though they are members of the Miami BGP Community 210. In examples, router 120 may be programmed, in response to receiving a request addressed to secondary Anycast address (192.0.2.2), to ignore any servers that are members of both (a) the Miami BGP community 210; and (b) the South Beach Site Servers BGP community. In this instance, the router 120 would then likely route the request from client 110 that is addressed to secondary Anycast address (192.0.2.2) to one of additional servers 200 that advertises the secondary Anycast address (192.0.2.2) (which is likely logically closer to router 120 than servers 160 and 170). In this example embodiment, the system 100 allows for a logically closer server (e.g., 200) to act as a dedicated backup server to server 180, even though it is a member of the same Miami BGP Community 210, as long as it is not also a South Beach Site Server.

In another example, client 130 attempts to access the service (e.g., DNS service) and sends a request with the primary Anycast address (192.0.2.1) to router 140. Router 140 then determines which of multiple servers advertising the primary Anycast address (192.0.2.1) should receive the request. Routers 160 and 170 may be collocated in a single site 175 at a geographic location in or near Dallas, Texas, while routers 180 and 190 may be collocated in a single site 185 at a geographic location in or near Miami, Florida. In this example, servers 160, 170, and 180 advertise the primary Anycast address (192.0.2.1). As such, router 140 may execute routing logic to identify, e.g., the least-cost routing to route the request from client 130 to one of the servers 160, 170, or 180. In this example, the request to the primary Anycast address may be routed to one of servers 160 or 170, which are located in or near Dallas, TX, like client 130 and router 140.

If the request to the primary Anycast address fails, however, client 130 may issue a request addressed to the secondary Anycast address (192.0.2.2). Upon receiving the request addressed to the secondary Anycast address (192.0.2.2), router 140 may determine where to route the request based on both (a) server(s) advertising the secondary Anycast address (192.0.2.2); and (b) advertised membership of such servers in particular border gateway protocol (BGP) communities. For example, a BGP community may be defined for all servers located in or near Dallas, Texas. In this example, servers 160 and 170, and additional servers 230 may be members of the Dallas BGP Community 240. Members of Dallas BGP Community 240 advertise their membership, and router 140 is programmed to keep a record of the servers' advertised memberships in BGP communities. Further, because router 140 is located in or near Dallas, it may be programmed to ignore any servers that advertise membership in the Dallas BGP Community 240.

In examples, the when the router 140 receives a request addressed to the secondary Anycast address (192.0.2.2), router 140 may be programmed to ignore any servers advertising the secondary Anycast address (192.0.2.2) that are also members of the Dallas BGP Community 240. In this example, router 140 would ignore servers 160, 170, and 230 in determining where to route the request addressed to secondary Anycast address (192.0.2.2), and the request would be addressed, e.g., to server 180 or 190. By excluding servers within the Dallas BGP Community 240, the system 100 allows, e.g., servers 160 and 170 to advertise and serve as both a primary and secondary service when operating normally, but it prevents router 140 from going back to servers 160 and 170 (that would have just failed the request to the primary Anycast address) when making a request to the secondary Anycast address. In this example, the router 140 would also not send the request addressed to the secondary Anycast address (192.0.2.2) to the other servers 230 that are part of Dallas BGP Community 240, even if those servers had not specifically failed. In examples, it is preferable to assume that the reason for the failure of the request to the primary Anycast address is an outage in the area that might have affected any servers in the Dallas BGP Community 240, even though this might result in a latency penalty.

In other examples, the router 140 may utilize one or more additional BGP communities in making a routing decision that is more granular. For instance, system 100 may define a BGP community for all servers that advertise service for both of the primary Anycast address (192.0.2.1) and the secondary Anycast address (192.0.2.2) (referred to herein as Primary/Secondary Servers, as discussed above). In examples, router 140 may be programmed, in response to receiving a request addressed to secondary Anycast address (192.0.2.2), to ignore any servers that are members of both (a) the Dallas BGP community 240 and (b) the Primary/Secondary Server BGP community. In this instance, the router 140 would then likely route the request from client 130 that is addressed to secondary Anycast address (192.0.2.2) to one of servers 230 (which is likely logically closer to router 140 that servers 180 and 190), if one of the servers 230 advertises the secondary Anycast address (192.0.2.2), but not the primary Anycast address (192.0.2.1). Otherwise, the router 140 would then likely route the request from client 130 that is addressed to secondary Anycast address (192.0.2.2) to one of servers 180 or 190. In this example embodiment, the system 100 allows for a logically closer server (e.g., 230) to potentially act as a backup server to servers 160 and 170, even though it is a member of the same Dallas BGP Community 190.

In still other examples, the router 140 may utilize one or more additional BGP communities in making a routing decision that is even more granular. For instance, system 100 may define a BGP community for all servers that are within a particular single site. For example, a BGP community may be defined for site 175 that houses both of servers 160 and 170 (hereinafter referred to as Highland Park Site Servers). In examples, the Highland Park Site might be a data center located in the Highland Park area of Dallas, TX. In the example shown in FIG. 1, servers 160 and 170 are Highland Park Site Servers, but additional servers 230 are not Highland Park Site Servers even though they are members of the Dallas BGP Community 240. In examples, router 140 may be programmed, in response to receiving a request addressed to secondary Anycast address (192.0.2.2), to ignore any servers that are members of both (a) the Dallas BGP Community 240; and (b) the Highland Park Site Servers BGP community. In this instance, the router 140 would then likely route the request from client 130 that is addressed to secondary Anycast address (192.0.2.2) to one of additional servers 230 that advertises the secondary Anycast address (192.0.2.2) (which is likely logically closer to router 140 than servers 180 and 190). In this example embodiment, the system 100 allows for a logically closer server (e.g., 230) to act as a dedicated backup server to servers 160 and 170, even though it is a member of the same Dallas BGP Community 240, as long as it is not also a Highland Park Site Server.

Although BGP communities are used herein as examples, those of skill in the art will understand that the present disclosure is not so limited. Any method for creating and maintaining groups or communities of servers that are advertised to routers can be used to filter servers at a router in the manner described herein. In addition, as used herein, "ignore" can mean exclude or, in some examples, de-prioritize. For example, in some examples, router 120 may be programmed to ignore servers 180 and 190 for requests addressed to a secondary Anycast address for a service (e.g., 192.0.2.2) by excluding those servers from the list of addresses from which router 120 may choose to send the request. In other examples, router 120 may be programmed to ignore servers 180 and 190 for requests addressed to a secondary Anycast address for a service (e.g., 192.0.2.2) by de-prioritizing those servers on the list of addresses from which router 120 may choose to send the request, but the router 120 may still route to servers 180 and 190, if no higher priority servers are available.

Figure 2:
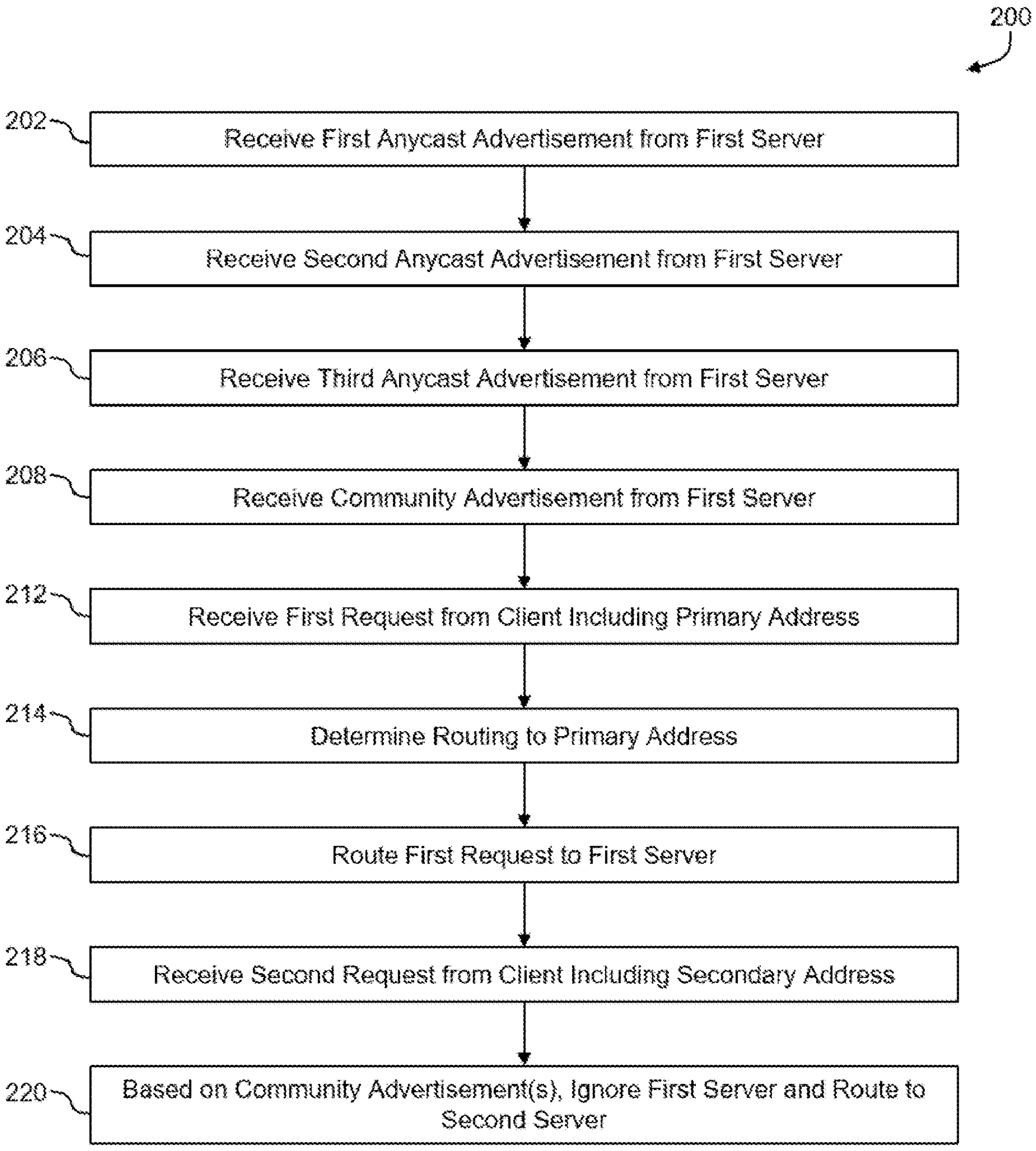
FIG. 2 depicts an example method for filtering advertisements of secondary servers in a computing network.

FIG. 2 depicts an example method 200 for routing requests in a computing network. In examples, method 200 may be performed by a routing device, such as routing device 120 or 140, described above in relation to FIG. 1. At operation 202, a first Anycast advertisement from a first server is received identifying the first server as a primary address for a service. For example, routers 120 and/or 140 may receive an advertisement from server 180 indicating that server 180 acts as a primary address (192.0.2.1) for a service, such as a DNS service.

Flow proceeds to operation 204, where a second Anycast advertisement from the first server is received identifying the first server as a secondary address for the service. For example, routers 120 and/or 140 may receive an advertisement from server 180 indicating that server 180 acts as a secondary address (192.0.2.2) for the service, such as a DNS service. In examples, both of the first and second advertisements may be received in a single message or in separate messages.

Flow proceeds to operation 206, where a third Anycast advertisement from a second server is received identifying the second server as the secondary address for the service. For example, routers 120 and/or 140 may receive an advertisement from server 190 that server 190 acts as a secondary address (192.0.2.2) for the service, such as a DNS service. In other examples, the second server may comprise server 160 or 170, each of which also advertises the secondary address for the service. As such, both of the first and second servers (e.g., 180 and 190/160/170, respectively) advertise the secondary address (192.0.2.2).

Flow proceeds to operation 208, where a community advertisement is received from the first server. For example, server 180 may advertise to routers 120 and 140 its membership in a community (e.g., a BGP community) entitled Miami BGP Community that is comprised of servers located in or near Miami, Florida.

Flow proceeds to operation 212, where a first request is received from a client for access to the service, wherein the first request includes the primary address. In examples, client 110 may send a service request to router 120 and include the primary address (192.0.2.1) in the request. Flow then proceeds to operation 214, where the router determines the routing to the primary address. For example, and based on a variety of factors, the router (e.g., router 120) may determine that among the servers advertising the primary address (192.0.2.1), server 180 is best suited to respond to the request. Determination at operation 214 may be based on a least-cost routing algorithm or otherwise. In operation 216, the first client request is forwarded to the first server. For example, router 120 may forward the request from client 110 to the Unicast address for server 180.

Flow proceeds to operation 218, where a second request from the client is received including the secondary address. For example, if the primary request routed to server 180 fails or is timed out, the client 110 may be programmed to send a second request for service to the secondary address (e.g., (192.0.2.2)), and the secondary request is received by router 120 (or router 140).

In examples, the router 120 (or router 140) treats requests that include the secondary address differently from requests that include the primary address. For example, at operation 220, based on the community advertisement received by the router, the first server is ignored, and the second request is routed to the second server. For example, router 120 may determine that server 180 should be ignored because, although the server 180 advertises the secondary address, it is a member of the Miami BGP Community 210. As such, even though the server 180 is logically closer than servers 160 and 170, the router 120 may route the request to one of servers 160 or 170 instead. In this scenario, the router 120 would also ignore servers 190 and 200 because they are part of the Miami BGP Community 210.

Figure 3:
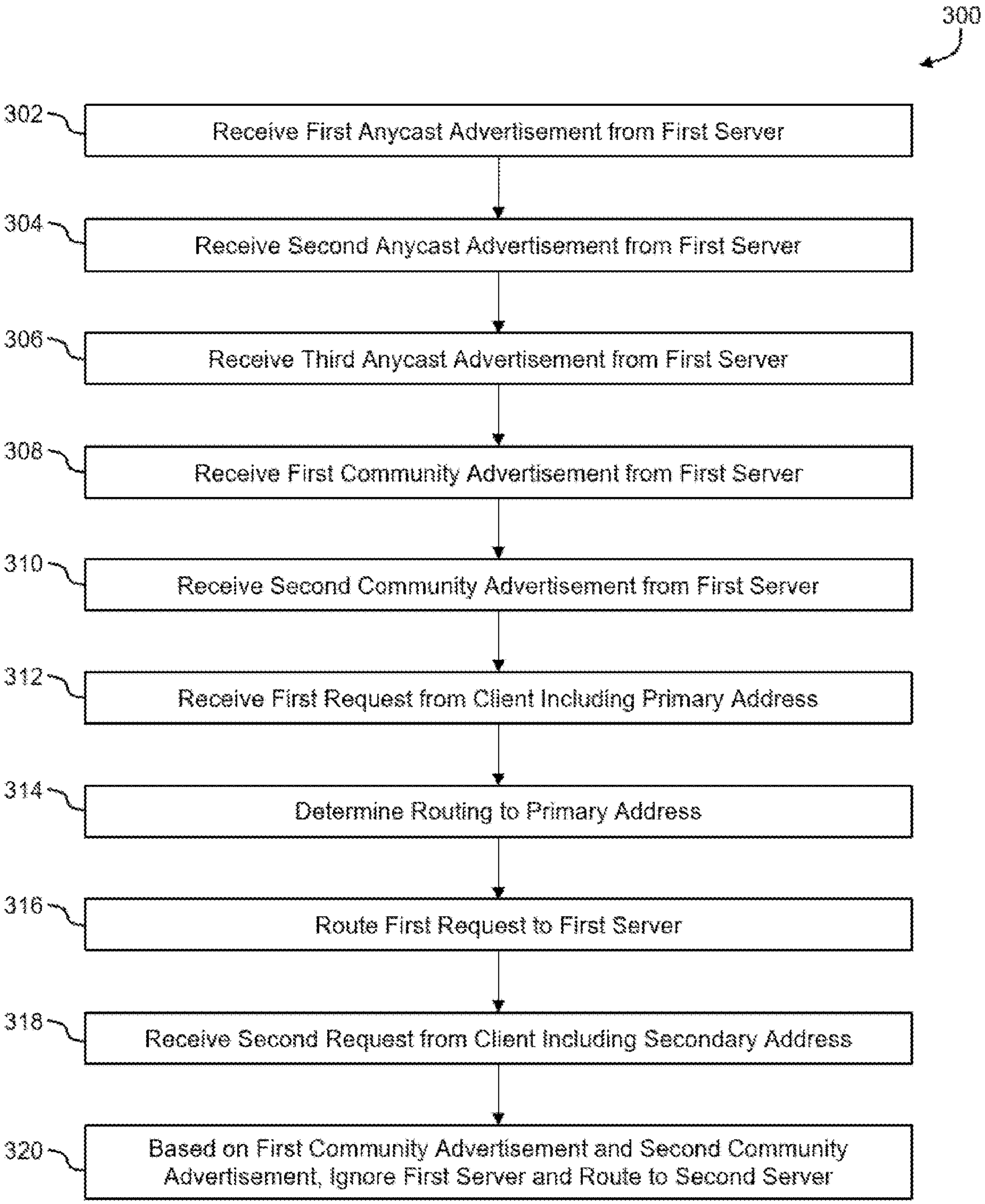
FIG. 3 depicts another example method for filtering advertisements of secondary servers in a computing network.

FIG. 3 depicts an example method 300 for routing requests in a computing network based on multiple community memberships. In examples, method 300 may be performed by a routing device, such as routing device 120 or 140, described above in relation to FIG. 1. At operation 302, a first Anycast advertisement from a first server is received identifying the first server as a primary address for a service. For example, routers 120 and/or 140 may receive an advertisement from server 180 indicating that server 180 acts as a primary address (192.0.2.1) for a service, such as a DNS service.

Flow proceeds to operation 304, where a second Anycast advertisement from the first server is received identifying the first server as a secondary address for the service. For example, routers 120 and/or 140 may receive an advertisement from server 180 indicating that server 180 acts as a secondary address (192.0.2.2) for the service, such as a DNS service. In examples, both of the first and second advertisements may be received in a single message or in separate messages.

Flow proceeds to operation 306, where a third Anycast advertisement from a second server is received identifying the second server as the secondary address for the service. For example, routers 120 and/or 140 may receive an advertisement from server 190 that server 190 acts as a secondary address (192.0.2.2) for the service, such as a DNS service. In other examples, the second server may comprise server 160 or 170, each of which also advertises the secondary address for the service. As such, both of the first and second servers (e.g., 180 and 190/160/170, respectively) advertise the secondary address (192.0.2.2).

Flow proceeds to operation 308, where a first community advertisement is received from the first server. For example, server 180 may advertise to routers 120 and 140 its membership in a community (e.g., a BGP community) entitled Miami BGP Community that is comprised of servers located in or near Miami, Florida.

Flow proceeds to operation 310, where a second community advertisement is received from the first server. For example, and optionally, the routers 120 and 140 may receive one or more additional advertisements from server 180 indicating that server 180 is a member of one or more additional BGP communities. In examples discussed above, the additional BGP communities may comprise a Primary/Secondary community and a South Beach Site community. As discussed, membership in additional communities may allow the router(s) to more granularly ignore certain servers' participation as secondary addresses for the service.

Flow proceeds to operation 312, where a first request is received from a client for access to the service, wherein the first request includes the primary address. In examples, client 110 may send a service request to router 120 and include the primary address (192.0.2.1) in the request. Flow then proceeds to operation 314, where the router determines the routing to the primary address. For example, and based on a variety of factors, the router (e.g., router 120) may determine that among the servers advertising the primary address (192.0.2.1), server 180 is best suited to respond to the request. Determination at operation 314 may be based on a least-cost routing algorithm or otherwise. In operation 316, the first client request is forwarded to the first server. For example, router 120 may forward the request from client 110 to the Unicast address for server 180.

Flow proceeds to operation 318, where a second request from the client is received including the secondary address. For example, if the primary request routed to server 180 fails or is timed out, the client 110 may be programmed to send a second request for service to the secondary address (e.g., (192.0.2.2)), and the secondary request is received by router 120 (or router 140).

In examples, the router 120 (or router 140) treats requests that include the secondary address differently from requests that include the primary address. For example, at operation 320, based on the community advertisements received by the router, the first server is ignored, and the second request is routed to the second server. For example, router 120 may determine that server 180 should be ignored because, although the server 180 advertises the secondary address, it is a member of the Miami BGP Community 210 and another community. For example, if the router 120 received the Miami BGP Community advertisement and additional advertisements about community membership for the first server, it can make a more granular determination of which server(s) to ignore. For example, if router 120 received advertisements indicating that servers 180 and 190 are both members of the Miami BGP Community, but received an advertisement from only server 180 that is in the Primary/Secondary community, then router 120 may be programmed to ignore only server 180 (since it is a member of both the Miami BGP Community and the Primary/Secondary community) and not ignore server 190 with respect to the second request from client 110. In this manner, an administrator or other individual setting up the communities may make the decision to allow a secondary server from the same geographic BGP community as the failed primary server so long as the secondary server is not also a Primary/Secondary server. Similarly, the router could use membership in a site community (such as the South Beach Site community discussed above) to determine which servers to ignore with respect to the second request from the client. The geographic-based communities, site communities, etc. described herein are exemplary only. Other types of communities may also be used in determining servers to ignore when routing client requests for a service.

Figure 4:
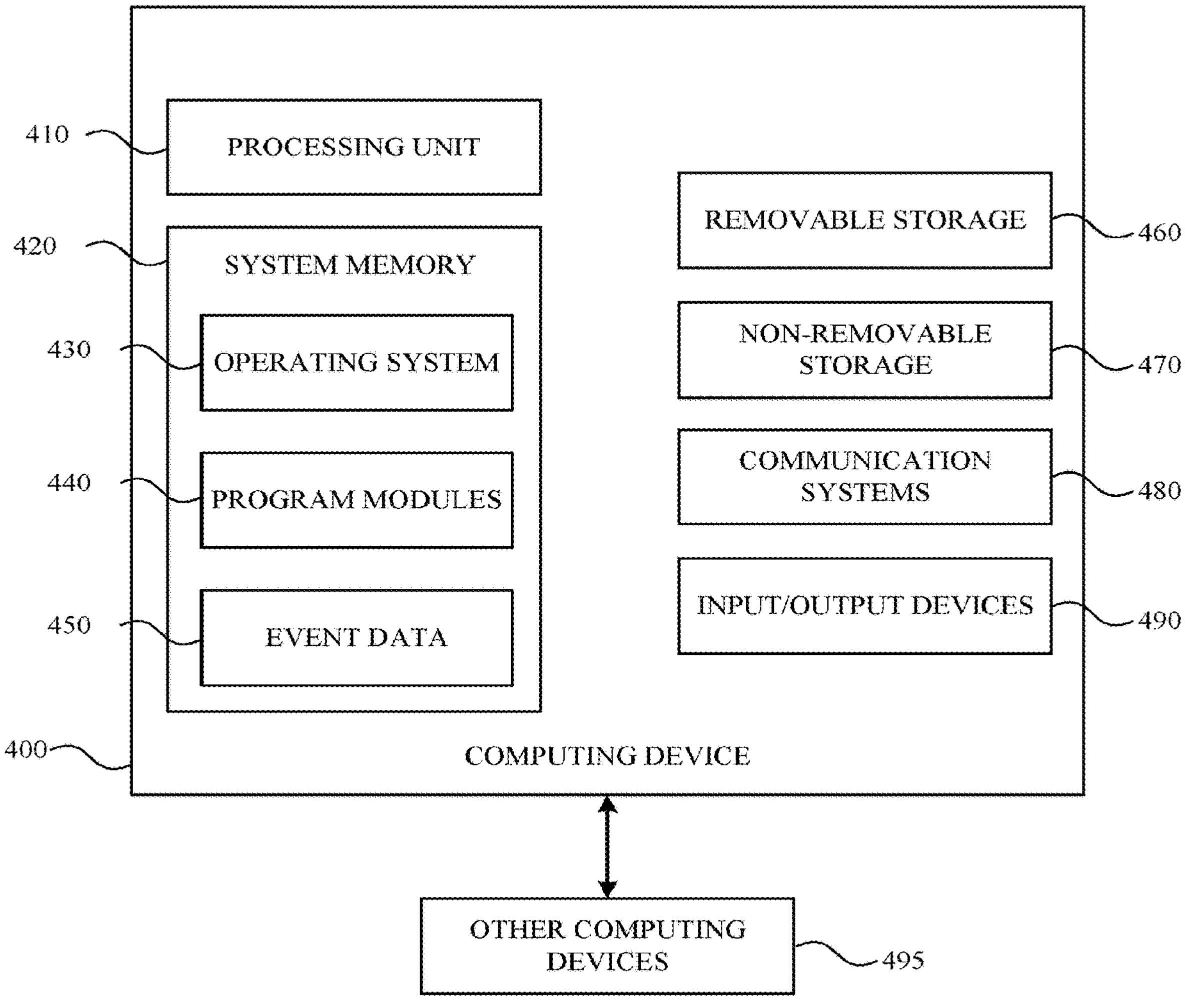
FIG. 4 depicts an example computing environment in which aspects of the present disclosure may be practiced.

FIG. 4 depicts an example computing device 400 according to the present application. The computing device 400, or various components and systems of the computing device 400, may be integrated or associated with clients 110, 130, routers 120, 140, servers 150, 160, 170, 180, 190, 200, 230, etc. As shown in FIG. 4, the physical components (e.g., hardware) of the computing device are illustrated and these physical components may be used to practice the various aspects of the present disclosure.

The computing device 400 may include at least one processing unit 410 and a system memory 420. The system memory 420 may include, but is not limited to, volatile storage (e.g., random access memory), non-volatile storage (e.g., read-only memory), flash memory, or any combination of such memories. The system memory 420 may also include an operating system 430 that controls the operation of the computing device 400 and one or more program modules 440. The program modules 440 may be responsible for gathering or determining event data 450 including endpoint data and/or network data. A number of different program modules and data files may be stored in the system memory 420. While executing on the processing unit 410, the program modules 440 may perform the various processes described above.

The computing device 400 may also have additional features or functionality. For example, the computing device 400 may include additional data storage devices (e.g., removable and/or non-removable storage devices) such as, for example, magnetic disks, optical disks, or tape. These additional storage devices are labeled as a removable storage 460 and a non-removable storage 470.

Examples of the disclosure may also be practiced in an electrical circuit comprising discrete electronic elements, packaged or integrated electronic chips containing logic gates, a circuit utilizing a microprocessor, or on a single chip containing electronic elements or microprocessors. For example, examples of the disclosure may be practiced via a system-on-a-chip (SOC) where each or many of the components illustrated in FIG. 4 may be integrated onto a single integrated circuit. Such a SOC device may include one or more processing units, graphics units, communications units, system virtualization units and various application functionality all of which are integrated (or "burned") onto the chip substrate as a single integrated circuit.

When operating via a SOC, the functionality, described herein, may be operated via application-specific logic integrated with other components of the computing device 400 on the single integrated circuit (chip). The disclosure may also be practiced using other technologies capable of performing logical operations such as, for example, AND, OR, and NOT, including but not limited to mechanical, optical, fluidic, and quantum technologies.

The computing device 400 may include one or more communication systems 480 that enable the computing device 400 to communicate with other computing devices 495 such as, for example, servers, routers, network devices, client computing devices, etc. Examples of communication systems 480 include, but are not limited to, wireless communications, wired communications, cellular communications, radio frequency (RF) transmitter, receiver, and/or transceiver circuitry, a Controller Area Network (CAN) bus, a universal serial bus (USB), parallel, serial ports, etc.

The computing device 400 may also have one or more input devices and/or one or more output devices shown as input/output devices 490. These input/output devices 490 may include a keyboard, a sound or voice input device, haptic devices, a touch, force and/or swipe input device, a display, speakers, etc. The aforementioned devices are examples and others may be used.

The term computer-readable media as used herein may include tangible, non-transitory computer storage media. Computer storage media may include volatile and nonvolatile, removable and non-removable media implemented in any method or technology for storage of information, such as computer readable instructions, data structures, or program modules.

The system memory 420, the removable storage 460, and the non-removable storage 470 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 400. Any such computer storage media may be part of the computing device 400. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

The terminology used herein is for the purpose of describing particular embodiments only and is not intended to be limiting of the inventive concept. Also, unless explicitly stated, the embodiments described herein are not mutually exclusive. Aspects of the embodiments described herein may be combined in some implementations.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure." Also, the term "exemplary" is intended to refer to an example or illustration. As used herein, the terms "use," "using," and "used" may be considered synonymous with the terms "utilize," "utilizing," and "utilized," respectively.

Although exemplary embodiments of systems and methods for protecting computing systems using declared constraints have been specifically described and illustrated herein, many modifications and variations will be apparent to those skilled in the art. Accordingly, it is to be understood systems and methods for protecting computing systems using declared constraints constructed according to principles of this disclosure may be embodied other than as specifically described herein. The disclosure is also defined in the following claims, and equivalents thereof.

What is claimed is:

1. A method, performed by a routing device, comprising:
- receiving a first indication identifying a first server as a primary address for a service;
- receiving a second indication identifying a second server as a secondary address for the service;
- receiving a first community advertisement identifying the first server as a member of a first community;
- receiving a first request from a client including the primary address;
- routing the first request to the first server;
- receiving a second request from the client including the secondary address;
- based at least on the first community advertisement, ignoring the first server and routing the second request to the second server.

2. The method of claim 1, wherein the service is a domain name service.

3. The method of claim 1, wherein the first community advertisement is a border gateway protocol community advertisement.

4. The method of claim 1, wherein the first community is a collection of servers in a particular geographic area and the routing device is located in the particular geographic area.

5. The method of claim 4, wherein the second server is outside of the particular geographic area.

6. The method of claim 1, further comprising receiving a second community advertisement identifying the first server as a member of a second community, wherein ignoring the first server and routing the second request to the second server is based on determining that the first server is a member of both of the first community and the second community.

7. The method of claim 6, wherein the second server is a member of the first community but not the second community.

8. The method of claim 7, wherein the second community comprises servers that are advertising both of the first address and the second address.

9. A routing device, comprising:
- at least one processor; and
- memory, operatively connected to the at least one processor and storing instructions that, when executed by the at least one processor, cause the routing device to perform a method, the method comprising:
  - receiving a first indication identifying a first server as a primary address for a service;
  - receiving a second indication identifying a second server as the secondary address for the service;
  - receiving a first community advertisement identifying the first server as a member of a first community;
  - receiving a first request from a client including the primary address;
  - routing the first request to the first server;
  - receiving a second request from the client including the secondary address;
  - based at least on the first community advertisement, ignoring the first server and routing the second request to the second server.

10. The routing device of claim 9, wherein the service is a domain name service.

11. The routing device of claim 9, wherein the first community advertisement is a border gateway protocol community advertisement.

12. The routing device of claim 9, wherein the first community is a collection of servers in a particular geographic area and the routing device is located in the particular geographic area.

13. The routing device of claim 12, wherein the second server is outside of the particular geographic area.

14. The routing device of claim 9, wherein the method further comprises:
- receiving a second community advertisement identifying the first server as a member of a second community, wherein ignoring the first server and routing the second request to the second server is based on determining that the first server is a member of both of the first community and the second community.

15. The routing device of claim 14, wherein the second server is a member of the first community but not the second community.

16. The routing device of claim 15, wherein the second community comprises servers that are advertising both of the first address and the second address.

17. A method, performed by a routing device, comprising:
- receiving a first indication identifying a first server as a primary address for a service;
- receiving a second indication identifying the first server as a secondary address for the service;
- receiving a third indication identifying a second server as the secondary address for the service;
- receiving a first community advertisement identifying the first server as a member of a first community;
- receiving a first request from a first client including the primary address;
- routing the first request to the first server;
- receiving a second request from the first client including the secondary address;
- based at least on the first community advertisement, ignoring the first server and routing the second request to the second server.

18. The method of claim 17, wherein the first community is a collection of servers in a particular geographic area and the routing device is located in the particular geographic area.

19. The method of claim 17, further comprising receiving a second community advertisement identifying the first server as a member of a second community, wherein ignoring the first server and routing the second request to the second server is based on determining that the first server is a member of both of the first community and the second community.

20. The method of claim 19, wherein the second server is a member of the first community but not the second community.

* * * * *